United States Patent [19]
Menzel

[11] Patent Number: 5,225,266
[45] Date of Patent: Jul. 6, 1993

[54] SPECIMEN SLIDE

[75] Inventor: Gerhard Menzel, Brunswick, Fed. Rep. of Germany

[73] Assignee: Waldemar Knittel Glasbearbeitungs GmbH, Brunswick, Fed. Rep. of Germany

[21] Appl. No.: 744,243

[22] Filed: Aug. 13, 1991

[30] Foreign Application Priority Data

May 31, 1991 [DE] Fed. Rep. of Germany ....... 4117791

[51] Int. Cl.⁵ .............................................. B32B 9/00
[52] U.S. Cl. .................................... 428/192; 428/220; 35/244
[58] Field of Search ............... 206/456; 428/192, 195, 428/220; 356/246, 244; 40/152, 152.1, 152.2

[56] References Cited

U.S. PATENT DOCUMENTS 4,159,875 7/1979 Hauser ................. 356/244

FOREIGN PATENT DOCUMENTS

0109208B1 5/1988 European Pat. Off. .
1925053 1/1970 Fed. Rep. of Germany .
2747200 5/1978 Fed. Rep. of Germany .
3631066 4/1988 Fed. Rep. of Germany .

*Primary Examiner*—Patrick J. Ryan
*Assistant Examiner*—W. Krynski
*Attorney, Agent, or Firm*—Foley & Lardner

[57] ABSTRACT

The invention relates to a specimen slide in the form of a strip-shaped glass plate. To improve production and handling of the slide the glass plate is surrounded on all sides by a plastic frame.

13 Claims, 1 Drawing Sheet

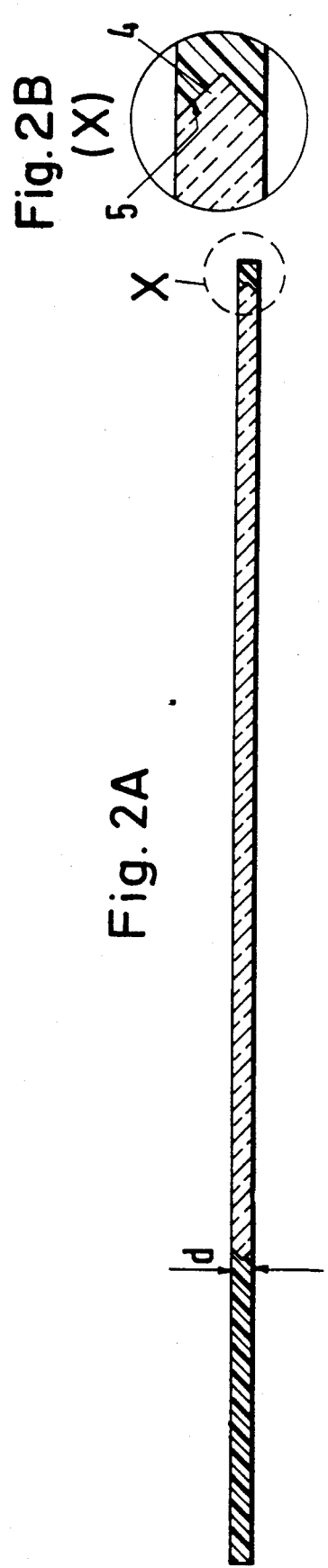
Fig. 2A
Fig. 2B (X)
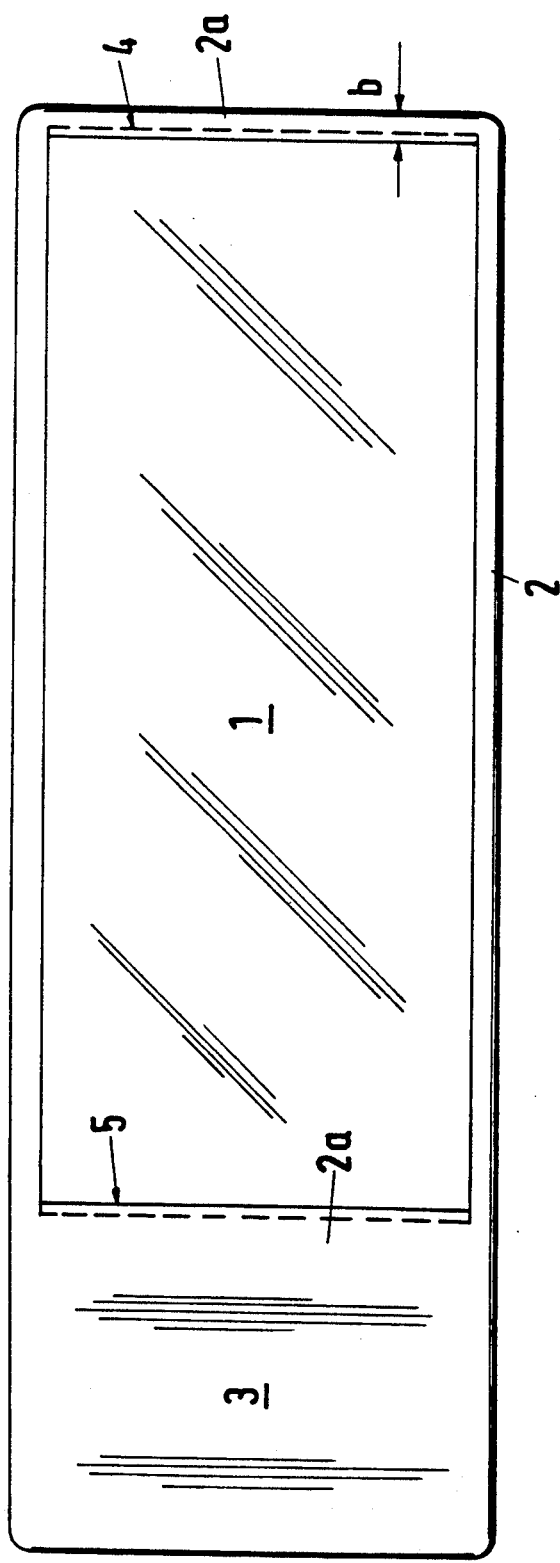
Fig. 1

SPECIMEN SLIDE

BACKGROUND OF THE INVENTION

The invention relates to a specimen slide in the form of a strip-shaped glass plate.

Such specimen slides are shown and described for example in European Patent No. 0,109,208. According to this reference the slides consist exclusively of a glass plate on which an inscription panel may be provided. This inscription panel is produced by a material-removing matt grinding or by the imprinting of an inscribable coating. In each of the embodiments, machining of the four edges of the glass plate is necessary in order to avoid injuries when handling these glass plates. Various forms of finish are known for the edge grinding including roof finish, round finish or bevel. The machining of the four glass plate edges is laborious and accordingly expensive.

Specimen slides without any possibility for inscription are also used on a large scale. These specimen slides consist of a glass plate edge-machined on all sides. With these slides, problems arise from the planar contact of the individual glass plates resting one on top of the other in a stack. For instance, these glass plates tend to stick to one another. Furthermore, relative displacement with respect to one another causes scratches on the glass-side surface.

SUMMARY OF THE INVENTION

It is therefore an object of the present invention to provide a specimen slide having production and handling advantages over the known prior art slides.

This object is accomplished by providing a specimen slide comprising a glass plate and a plastic frame surrounding the edges of the glass plate.

There is further provided a specimen slide comprising a glass plate and a plastic frame surrounding the edges of the glass plate, wherein the plastic frame is widened on one side into a headpiece.

There is further provided a method of making a specimen slide comprising clipping a glass plate into a plastic frame.

There is further provided a method of making a specimen slide comprising ultrasonically embedding a glass plate into a plastic frame.

Further objects, features, and advantages of the present invention will become apparent from the detailed description of preferred embodiments that follows.

BRIEF DESCRIPTION OF THE DRAWINGS

FIG. 1 shows a specimen slide in plan view; and
FIG. 2 shows a specimen slide according to FIG. 1 in longitudinal section.

DETAILED DESCRIPTION OF THE PREFERRED EMBODIMENTS

The plastic frame may be made by any known process. For example, the plastic frame may be an injection molding of thermoplastic material or a diecast molding of thermoset material. It is also possible to punch the plastic frame out of plastic sheets as a blank.

In one embodiment of the invention, the width of the plastic frame may be the same all around. A width of about 1.5 mm is an acceptable width. In this embodiment, the specimen slide is preferably not inscribed.

According to a second embodiment of the invention, the plastic frame is widened on one narrow side into a headpiece, which serves as a grip and, may be designed at least on one flat side as an inscription panel. It is expedient if the surface of the headpiece forming the inscription panel is eroded.

To facilitate handling of the specimen slide, the headpiece may be of a colored design and/or contain other markings to facilitate identification and handling of the slide. The headpiece of the plastic frame may have a different marking on its two flat sides. This makes it possible for the glass plate to be wetted on one side and made adhesive on its opposite side.

If the plastic frame is an injection molding or diecast molding, it is expedient if the glass plate is clipped into the plastic frame. In this case it is advantageous if the plastic frame engages with a form fit over the edge of the glass plate only on two opposite sides. Furthermore, it is expedient if the two edges of the glass plate which are engaged with a form fit by the plastic frame are provided with a roof ground finish.

In this process, only the two narrow sides of the glass plate need be engaged with a form fit. Accordingly, it is possible to leave the longitudinal edges of the glass plate unmachined, so there is a considerable saving in the machining of the glass plates.

It is advantageous if the thickness of the plastic frame (d) is just a few hundredths of a mm thicker than the thickness of the glass plate so as to minimize or prevent the direct contact of glass plates with one another. As a result, adhering of the glass plates to one another and scratching of the glass plates against one another can be avoided. Furthermore, since the glass plates no longer lie directly one on top of the other, they can also be stored for longer periods of time.

A bearing surface protruding only slightly beyond the flat side of the glass plate can also be achieved, in the case of the plastic frame designed as an injection molding or diecast molding, if the gate marks of the plastic frame are located on its flat side. These gate marks have a height of only about a few hundredths of a mm and are therefore scarcely perceptible to the naked eye, but they prevent the direct contact of stacked glass plates with one another, so that the advantages mentioned above can be achieved.

If the plastic frame consists of a punched-out blank, then it is preferable if the glass plate is ultrasonically embedded in the plastic frame. In this case, all the edges of the glass plate may have an untreated 90° cut edge. The plastic bonds to the edges during ultrasonic processing with adequate strength so as to prevent an undesired separation of the glass plate from the plastic frame.

The specimen slide according to the invention has numerous advantages over the prior art slides. Specifically, it is of a lower weight than the prior art slides and the plastic frame surrounding the glass plate on all sides prevents damage during transit as well as injuries from cutting during handling. Since abrasion due to sharp glass edges on the carton can no longer occur, clean packing of the slides is achieved. The plastic frame permits marking by different colors in a simple way. If a headpiece is provided, it permits inscription on both sides.

Further features of the invention are explained in greater detail together with reference to an exemplary embodiment represented in the figures.

The specimen slide represented by FIG. 1 consists of a strip-shaped glass plate 1, which is clipped into a plastic frame 2. The plastic frame 2 is widened on one narrow side into a headpiece 3.

The plastic frame 2 engages with a form fit over the glass plate 1 only on its two narrow sides, the edges of which are provided with a roof ground finish 4, as can be seen in the detail X, represented on an enlarged scale. The sections 2a of the plastic frame 2 engaging over this roof finish 4 of the glass plate 1 each have a clip-in groove 5 adapted to the edge ground finish. If the two narrow sides of the glass plate 1 are provided at the edge with a roof finish 4, the clip-in groove 5 is correspondingly designed triangularly in cross section. In the case of a round finish, the cross section of the clip-in groove 5 would correspond approximately to a semi-circular surface.

The width b of the plastic frame 2 on the two longitudinal sections as well as on the narrow-side section 2a, lying on the right in FIG. 1, is about 1.5 mm. The headpiece 3 may be, for example, about 18 mm long if the overall width of the specimen slide is about 25.8 mm.

The illustrated plastic frame 2 is an injection molding or diecast molding. In this case, the outer edge of the plastic frame may be designed in the form of a ground glass plate outer edge. Conventional glass plates have an outer edge ground finish in the form of a roof finish or round finish or else a bevel. The outer edge of the plastic frame can be correspondingly designed according to customer requirements.

The typical dimensions for specimen slides are width about 26 mm and length about 76 mm including the inscription panel. The overall dimensions of the glass plate 1 according to the invention may be in the range of 26 mm in width and 58 mm in length. The thickness d of the plastic frame 2 should be thicker than the thickness of the glass plate 1, preferably in the range of five hundredths to one tenth of a mm.

What is claimed is:

1. A specimen slide, comprising:
    a rectangular shaped glass plate having four edges; and
    a plastic frame surrounding the four edges of the glass plate, the plastic frame having four sides, one of the four sides of the plastic frame abuts a narrow edge of the glass plate and is wider than the other sides thereby forming a headpiece, said headpiece includes at least one flat side comprising an inscription panel, a thickness of the plastic frame is greater than a thickness of the glass plate by not more than 1/10 of a mm, the plastic frame engages with a form fit over at least two opposite edges of the glass plate, and the width of the sides of the plastic frame other than the side forming the headpiece is about 1.5 mm.

2. The specimen slide as claimed in claim 1, wherein the plastic frame comprises an injection molding or a diecast molding.

3. The specimen slide as claimed in claim 1, wherein the glass plate is clipped into the plastic frame.

4. The specimen slide as claimed in claim 1, wherein the at least two opposite edges of the glass plate engaged with a form fit by the plastic frame are provided with a roof ground finish.

5. The specimen slide as claimed in claim 1, wherein said at least two opposite edges are the two narrow edges of the glass plate.

6. The specimen slide as claimed in claim 5, wherein sections of the plastic frame engaging with a form fit over the at least two opposite edges of the glass plate have a clip-in groove adapted to the roof ground finish of the glass plate edges.

7. The specimen slide as claimed in claim 1, wherein gate marks from a molding procedure lie on the flat side of the plastic frame so as to prevent direct contact of stacked glass plates with one another.

8. The specimen slide as claimed in claim 1, wherein the plastic frame comprises a blank punched out from a plastic sheet.

9. The specimen slide as claimed in claim 8, wherein the glass plate is ultrasonically embedded in the plastic frame.

10. The specimen slide as claimed in claim 1, wherein each of the four edges of the glass plate is an untreated 90° cut edge.

11. The specimen slide as claimed in claim 1, wherein the inscription panel includes an eroded surface of the headpiece.

12. The specimen slide as claimed in claim 1, wherein the plastic frame is colored.

13. The specimen slide as claimed in claim 1, wherein an outer edge of the plastic frame is in the form of a ground glass plate outer edge.

* * * * *